INVENTOR.
D. H. ANNIN.
BY
ATTORNEY

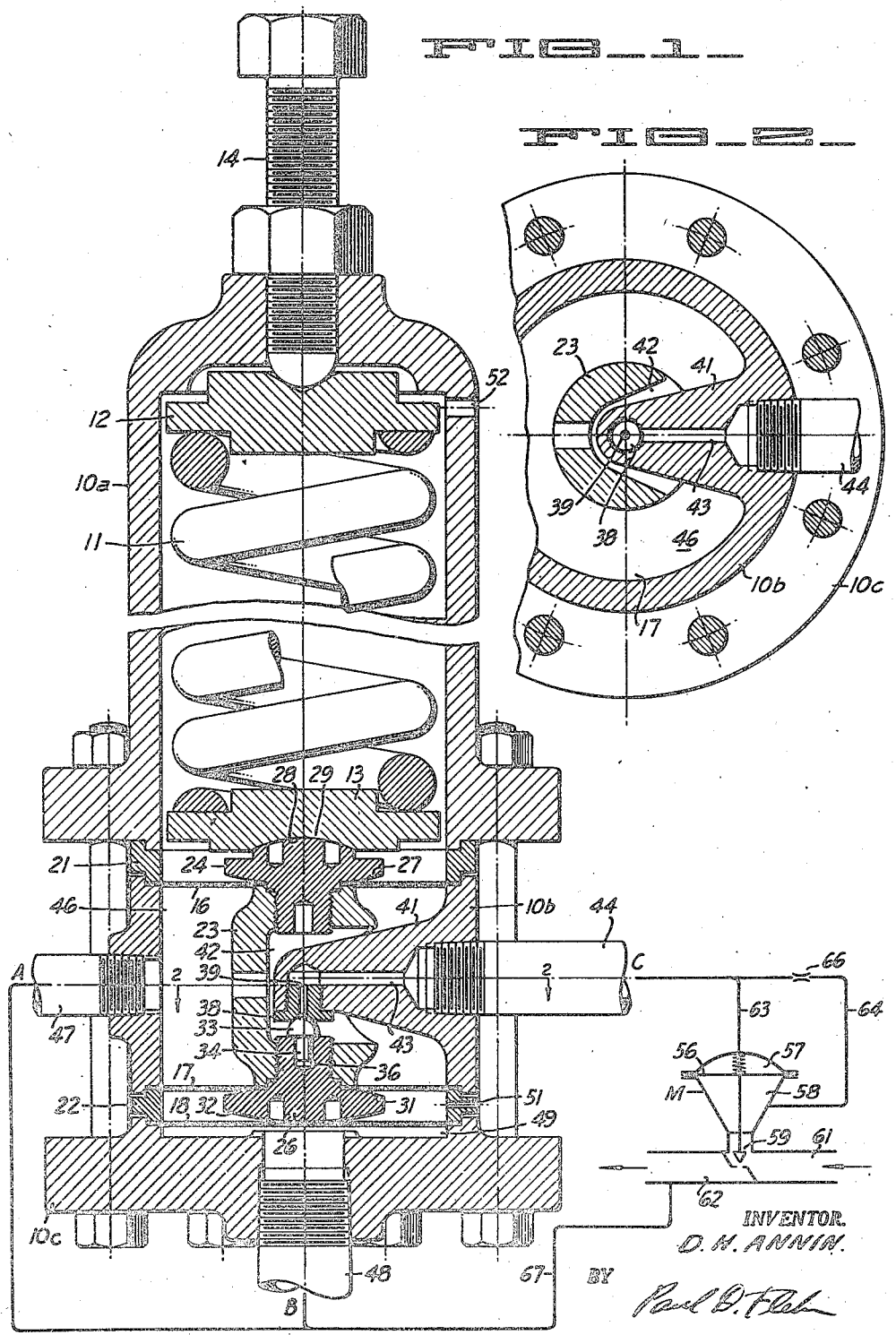

Patented Dec. 30, 1947

2,433,414

UNITED STATES PATENT OFFICE 2,433,414

FLUID FLOW CONTROL DEVICE

Douglas H. Annin, Oakland, Calif., assignor to Fluid Control Engineering Co., Piedmont, Calif., a copartnership Application November 20, 1944, Serial No. 564,229

2 Claims. (Cl. 50—23)

This invention relates generally to fluid flow control devices of the type in which the positioning of valve elements is controlled by fluid pressure upon a diaphragm.

It is an object of the invention to provide a device of the above character having a relatively small flow capacity but which will give reliable and sensitive response over a wide range of applied pressures.

Another object of the invention is to provide a flow control device of the above character which is particularly adapted for use as a pilot valve for such operations as the automatic control of a main valve.

A further object of the invention is to provide a valve of the above character having a relatively simple and mechanical construction, and which by simple shifting of certain parts can be adapted to a variety of operations.

Additional objects of the invention will appear from the following description in which the preferred embodiments have been set forth in detail in conjunction with the accompanying drawing.

Referring to the drawing:

Fig. 1 is a side elevational view in section, illustrating a valve incorporating the present invention, and also diagrammatically showing connections which can be made between such a valve and a main valve.

Fig. 2 is a longitudinal cross-sectional view taken along the line 2—2 of Fig. 1.

Figure 3:
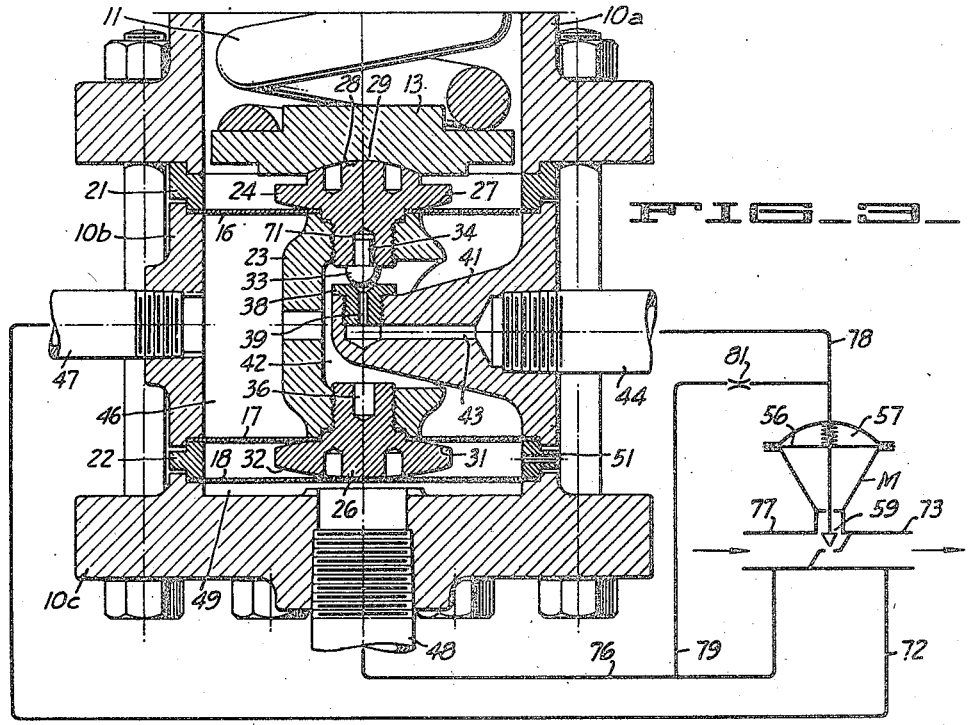
Fig. 3 is a side elevational view in section, illustrating a change in the positioning of certain parts to adapt the device for use to provide automatic back pressure control.

That form of the invention illustrated in Fig. 1 consists of a body formed mainly of the body parts 10a, 10b and 10c. Part 10a is in the form of a bonnet for housing the loading spring 11. Part 10b serves to mount and space two operating diaphragms, while part 10c is an end closure plate.

The loading spring 11 within the bonnet 10a has one end seated upon a thrust disc 12, and its other end seated upon the thrust member 13, which as will be presently explained applies loading force to the movable valve element. In order to adjust the loading force the disc 12 is seated upon the inner end of an adjustable screw 14, threaded in one end of the bonnet.

Between the bonnet and the end plate 10c there are in this instance three diaphragms 16, 17 and 18. These diaphragms are circularly contoured and have their peripheral edge portions engaged by mounting means. They are disposed in spaced parallel relationship and are at right angles to a common central axis. It is preferable to form these diaphragms of relatively thin flexible sheet metal, such as stainless steel, phosphor bronze, or the like.

The peripheral edge portion of diaphragm 16 is shown clamped between one end of the body part 10b, and a spacer ring 21 disposed between body 10b and the adjacent portion of the bonnet 10a. In this connection note that body part 10b is cylindrically shaped. The peripheral edge of diaphragm 17 is clamped between the other end of the body part 10b and a spacer ring 22, the latter being interposed between the body part 10b and the end plate 10c. Diaphragm 18 is in turn interposed and clamped between ring 22 and end plate 10c.

Mounting means for one of the valve elements is formed by a member 23, which can be shaped substantially as illustrated, and which has its ends suitably attached to the central portions of the diaphragms 16 and 17. Thus a stud 24 is accommodated within a central opening in diaphragm 16, and is threaded into the adjacent end of member 23. A generally similar stud 26 is accommodated within an opening in diaphragm 17 and is threaded into the adjacent end of member 23. The annular face 27 of stud 24 is preferably convexly curved as illustrated, as for example to correspond with the surface of a sphere, in order to accommodate flexing movements of the diaphragm 16 without causing bending of the diaphragm over sharp edges. This stud is also shown provided with a spherically shaped surface 28, adapted to form an abutment with a similarly formed concave surface 29 on the thrust member 13. Stud 26 is likewise formed with curved surfaces 31 and 32, the latter forming a convex surface for abutment with diaphragm 18.

The valve member carried by the means connecting the diaphragms 16 and 17, is in this instance an element 33 in the form of a semi-spherical member. Element 33 is formed upon or attached to one end of a pin 34, which in turn is loosely disposed within the bore 36. This bore is in alignment with the diaphragms and the axis of the compression spring 11, so that the valve element 33 is likewise so aligned. The loose fit of pin 34 in bore 36 permits a substantial amount of self aligning action.

The second valve element, which cooperates with element 33, is in the form of a seat 38 which has a port or orifice 39 through the same. This seat is threaded into or otherwise suitably attached to the inner end of an extension 41, which has its inner end accommodated within a recess 42 formed in the member 23. Extension 41 can be integral with or mounted upon the body part 10b. It is provided with a duct or passage 43 serving to connect the orifice 39 with a connecting pipe 44.

The space 46 surrounding member 23 is shown connected with pipe 47. A third pipe 48 is shown connecting to the space 49 on one side of the diaphragm 18. A suitable vent 51 can be provided for venting the space between diaphragms 17 and 18 to the atmosphere. A suitable vent 52 is also provided for maintaining the space within bonnet 10a at atmospheric pressure.

The device described above can be used in various ways. Assuming application of fluid pressure to the pipe 44, it will be evident that application of fluid pressure to pipe 48 serves to urge the three diaphragms against the loading spring 11 and in a direction to maintain the valve elements closed. Upon lowering the pressure applied to pipe 48 below a predetermined value, the loading spring forces the valve element 33 downwardly as viewed in Fig. 1, thus permitting fluid from pipe 44 to escape into space 46. Any pressure in space 46 is balanced out because it acts upon equal pressure areas provided with diaphragms 16 and 17.

One manner in which the device can be used to control a main valve has been illustrated diagrammatically in Fig. 1. The main valve M in this instance consists of a fluid operated diaphragm 56 with fluid chambers 57 and 58 above and below the same. The diaphragm is directly connected to the valve member 59, which controls flow of fluid between the inlet and outlet passages 61 and 62. Line 63 serves to connect chamber 57 with the pipe 44. Line 64 serves to connect the chamber 58, through the flow restricting orifice 66, to the pipe 44. Pipe 67 connects the outlet passage 62 with both the pipes 47 and 48. Chamber 58 in this instance is in free communication with the inlet passage 61, and therefore connection of line 64 with the chamber 58 is the same as a connection to the inlet side.

With the connections to a main valve as described above, the apparatus operates as an automatic pressure reducing regulator for air or other gas. The tension on the loading spring is set in accordance with the pressure which it is desired to maintain within the outlet 62. The inlet 61 connects with a suitable source of gas at a substantially higher pressure. Should the pressure in outlet 62 drop below the desired value, the diaphragms are flexed downwardly as viewed in Fig. 1, thus permitting an increased flow of gas through pipe 44 by virtue of greater separation of the valve elements. Increased flow of gas through pipe 44, because of the flow restricting orifice 66, results in a drop in pressure within the line 63 and chamber 57, thus permitting the inlet pressure in chamber 58 to urge the diaphragm 56 upwardly to further open the main valve 59. Conversely if the pressure in outlet 62 increases beyond a desired level, then reverse operations take place, that is there is a closing between the elements 33 and 38, accompanied by decreased flow of fluid through pipe 44, thus causing a greater pressure to be built up in chamber 57 to urge the valve member 59 closer to its seat.

A feature of the device described above is that certain parts are reversible to make it possible to adapt the device for different types of operation, as for example as a part of back pressure regulating apparatus. Fig. 3 illustrates a change in the positioning of certain of the parts so that the device is capable of operating in apparatus for automatic back pressure regulation. Thus the valve member 33 has been removed from the socket or bore 36, and has been loosely fitted in the socket or bore 71 provided in the upper stud 24. Body part 10b has been inverted or turned end for end, so that the seat ring 38 now cooperates with the valve member 33. Fig. 3 shows suitable pipe connections for connecting the device with a main valve M, whereby the combination serves as an automatic back pressure regulator. Thus line 72 connects pipe 47 and the chamber 46 to the outlet passage 73 of the main valve. Line 76 connects pipe 48 and pressure chamber 49 with the inlet passage 77 of the main valve. Line 78 connects pipe 44 to the chamber 57 above the diaphragm of the main valve. The inlet passage 77 of the main valve is also connected by line 79, through flow restricting orifice 81, to the line 78 and to the chamber 57.

Assuming that the outlet passage 73 is connected to a low pressure system or is vented to the atmosphere, a gas pressure system connected to the inlet 77 can be automatically regulated by controlled venting through the main valve M when the inlet pressure reaches and tends to exceed a desired pressure level. Thus when the pressure in passage 77 exceeds a predetermined value for which the loading spring 11 is set, diaphragm 18 is urged upwardly to cause opening movement of the valve member 33 with respect to the seat 38. This permits increased flow through line 78, which because of the flow restricting orifice 81, causes a drop in the pressure maintained in chamber 57. Thus diaphragm 56 flexes upwardly to open or to increase the rate of flow through the main valve.

The feature of adaptability described above is made possible because of the manner in which the valve member 33 can be placed in either one of its two operating positions, and because of the way in which the body part 10b can be inverted or turned end for end, to cooperate with either position of member 33. It will be noted that valve member 33 together with seat 38 is aligned with the central common axis of the diaphragms 16 and 17. Likewise member 23 is retained in proper alignment solely by virtue of its connection with the diaphragms 16 and 17. This makes for frictionless movement of the operating parts, while at the same time eliminating conventional guide bushings.

Figure 4:
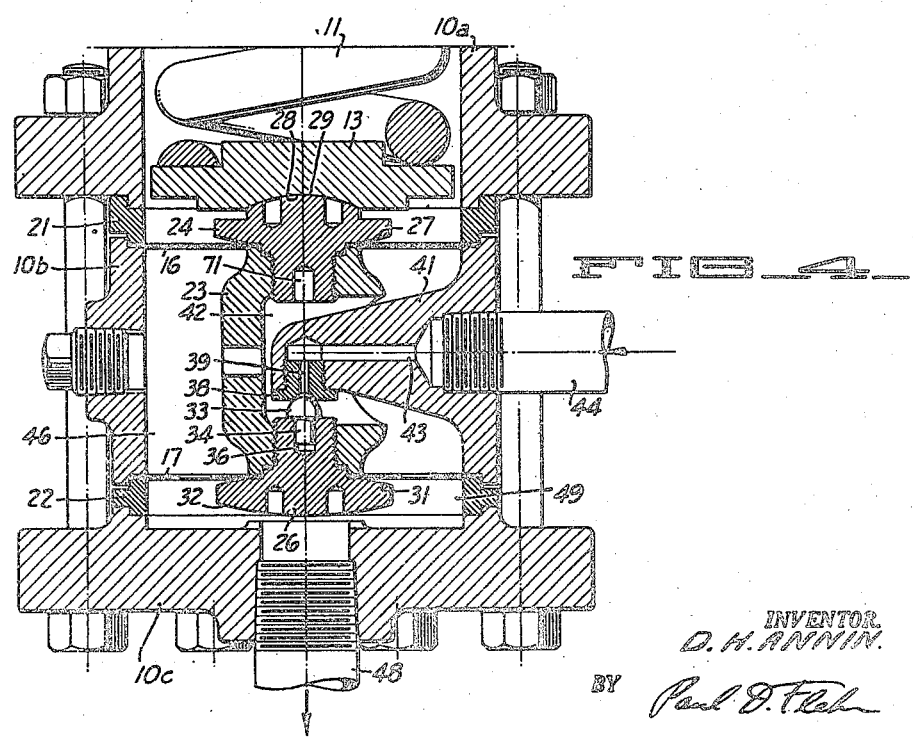
Fig. 4 is a side elevational view in section showing a modified arrangement of diaphragms for the device.

The arrangement of diaphragms can be varied to suit different conditions. For example in many instances the diaphragm 18 can be omitted in entirety, diaphragm 17 can be perforated, and diaphragm 16 can be used as the fluid pressure operated member for moving the valve member 33 between open and closed positions. An arrangement of this sort has been illustrated in Fig. 4. Thus in this instance diaphragm 18 is omitted in entirety, and diaphragm 17 has been perforated. With this arrangement pressure of gas in chamber 46 acts upon diaphragm 16 in a direction to urge the same upwardly. Assuming that pipes 44 and 48 constitute inlet and outlet respectively, with pipe 44 connected to a source of fluid under pressure, the device will operate as a small capacity automatic pressure reducing valve. Such an assembly can also be utilized together with a main valve for various operations such as automatic pressure reduction.

I claim:

1. In a valve for control of fluid flow, a pair of flexible diaphragms, means forming a valve body serving to mount the diaphragms in spaced parallel relationship and in axial alignment, a pair of cooperating valve elements, one forming a valve member and the other forming a ported valve seat adapted to be engaged by the valve member to close the port, a rigid mounting means for said valve member having spaced end portions of the same rigidly attached to the central portions of the diaphragms to support said mounting means for movement in opposite directions along the common axis of the diaphragms, said mounting means having spaced and oppositely faced portions of the same adapted to position and retain said valve member in either one of two operating locations, a portion of the valve body comprising a body part positioned between the two diaphragms and reversible end for end in either one of two operating positions, and a member secured to said last named body part and extending inwardly of the same with its inner end disposed between the two locations of the valve member, the inner end of said extension serving to support the valve seat for cooperation with the valve member.

2. In a valve for control of fluid flow, a pair of flexible diaphragms, means forming a valve body serving to mount the diaphragms in spaced parallel relationship and in axial alignment, a pair of cooperating valve elements, one forming a valve member and the other forming a ported valve seat adapted to be engaged by the valve member to close the ports, a rigid mounting means for said valve member having oppositely faced end portions of the same adapted to receive and retain said valve member, a pair of duplicate members serving to attach said end portions of the mounting to said diaphragms for movement in opposite directions along the common axis of the diaphragms, a portion of the valve body comprising a body part positioned between the two diaphragms and reversible end for end in either one of two cooperating positions, and a member secured to said last named body part and extending inwardly of the same with its inner end disposed between the two locations of the valve member, the inner end of said extension serving to support the valve seat for cooperating with the valve member.

DOUGLAS H. ANNIN.

REFERENCES CITED

The following references are of record in the file of this patent:

UNITED STATES PATENTS

| Number | Name | Date |
|---|---|---|
| 1,733,432 | Slinger | Oct. 29, 1929 |
| 796,959 | Croslen | Aug. 8, 1905 |